Patented Jan. 1, 1929.

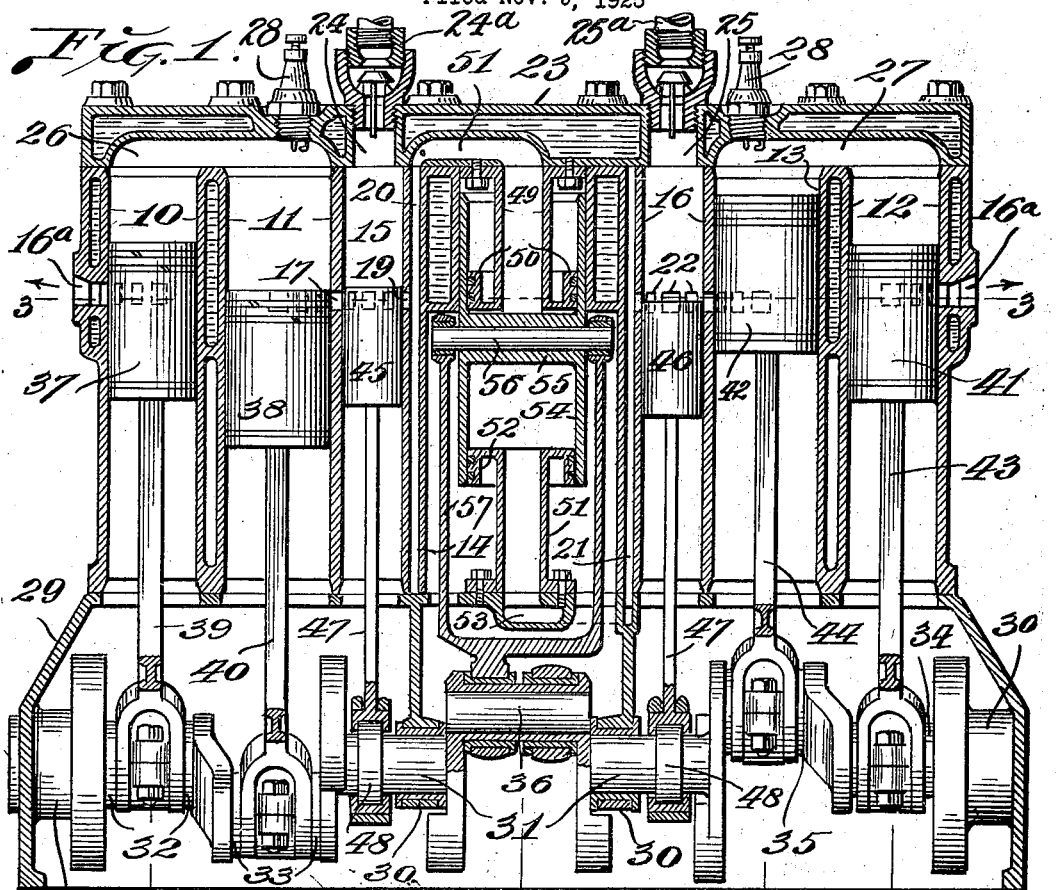

1,697,554

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed November 5, 1925. Serial No. 66,967.

My invention relates to internal combustion engines of the multi-cylinder, two stroke cycle type, and has for its principal objects, to generally improve upon and simplify the construction of the existing forms of two stroke cycle internal combustion engines; to provide an improvement in two stroke cycle engines that have double acting fresh charge pump reciprocating features; to provide a two stroke cycle engine structure combining as one unit, four combustion cylinders arranged in two pairs, the members of each pair joined at their head ends, by a common compression and combustion chamber with a dual pump chamber, double acting fresh charge volume pump arranged between the two pairs of combustion cylinders, functioning as a fresh charge inducting means to the pair of combustion cylinders on one side of the double acting pump, and the other of the pump chambers of the double acting pump function as a fresh charge inducting means to the pair of combustion cylinders on the other side of the double acting pump.

A further object of my invention is to provide an engine of the character referred to with a crank shaft having separate crank pins to which the two pistons of each adjacent pair of combustion cylinders are separately connected. The piston displacement of the two combustion chambers forming a pair of adjacent combustion cylinders being different in size or volume and the crank pin to which the piston of the cylinder having the least piston displacement is connected, being arranged in advance in the direction of rotation, relative to the respective position of the other of the two crank pins.

As a result of my improved construction I am able to provide a two stroke cycle engine of great simplicity, very compact, of comparatively few parts and having a relatively high degree of crank leverage at the time of maximum combustion pressure.

With the foregoing and other objects in view, my invention consists in certain novel features of construction and arrangement of parts that will be hereinafter more fully described and claimed and illustrated in the accompanying drawing in which:

Fig. 1 is a vertical longitudinal section taken on a medial plane through an engine power unit of my improved construction.

Fig. 2 is a diagrammatic view that graphically illustrates the relative positions of the cranks of crank shaft of my improved engine.

Fig. 3 is a horizontal section taken on the line 3—3 of Fig. 1.

Referring by numerals to the accompanying drawings which illustrate a practical embodiment of my invention, 10, 11, 12 and 13 designate combustion or power cylinders that are arranged in pairs with cylinders 10 and 11 constituting one pair, and cylinders 12 and 13 constituting the other pair. The four cylinders are arranged "in row", that is, their axes which are parallel all occupy the same plane.

Cylinders 10 and 11 are disposed at one end of the row, and cylinders 12 and 13 at the other end, and the two pairs of cylinders are spaced a sufficient distance apart to accommodate a charge volume pump that occupies an intermediate or centrally arranged cylindrical housing 14 and a pair of relatively small piston valve chambers 15 and 16, the latter being arranged respectively between the pump housing or cylinder 14 and the inner members 11 and 13 of the pairs of combustion cylinders.

The diameters of the chambers in cylinders 10 and 12 are slightly less than the diameters of the chambers in cylinders 11 and 13, consequently the piston sweep displacement in the larger combustion chambers 11 and 13 is greater than the piston sweep displacement of the chambers 10 and 12 of least diameter.

Formed through the walls of the cylinders 10 and 12 are exhaust ports such as 16$^a$, the same being located so that they are uncovered and open only when the pistons that operate within said cylinders are at the outer ends of their strokes.

Charge volume inlet ports 17 are formed through the wall between valve chamber 15 and combustion chamber 11, and corresponding ports 18 connect chambers 16 and 13.

These two sets of ports are uncovered and open only when the pistons within the chambers 11 and 13 are at the lower ends of their strokes.

Charge volume inlet ports 19 connect piston valve chamber 15 with a duct 20 that is formed between cylinders 11 and 14, said duct being closed at its lower end and open at its upper end, and connecting valve chamber 16 with a corresponding duct 21 that is formed between cylinders 16 and 14 are inlet ports 22.

Ports 19 and 22 are uncovered and open only when the piston valves that operate within chambers 15 and 16 are at the lower ends of their strokes.

Secured to the head ends of the entire series of cylinders and closing the chambers therein is a head block 23, through which are formed inlet ports 24 and 25, that communicate respectively with the head or inner ends of piston valve chambers 15 and 16. These inlet ports 24 and 25 are connected in any suitable manner to a suitable source of gaseous fuel supply, for instance, a carburetor and located in said connections between said inlet ports and carburetor are inlet check valves 24ª, 25ª respectively.

Formed in the underside of head block 23 are shallow pockets 26 and 27 that connect respectively the upper or head ends of the combustion chambers in cylinders 10 and 11, and 12 and 13. These pockets constitute common compression and combustion clearance chambers for the combustion chambers with which they are associated.

Seated in head 23 at points above the chambers in cylinders 11 and 13 are ignition devices such as spark plugs 28, and the inner ends of the electrodes thereof, project into the respective chambers 26 and 27.

Arranged beneath the five cylinders is a crank case 29 having four main bearings 30 for a crank shaft 31 that has five cranks 32, 33, 34, 35 and 36.

Cranks 32 and 33 are disposed respectively beneath cylinders 10 and 11, with cranks 34 and 35 disposed respectively beneath cylinders 12 and 13 and with the centrally arranged crank 36 disposed beneath cylinder 14.

Crank 32 occupies a radial position approximately 45° in advance of crank 33 in the direction of crank rotation and likewise crank 34 occupies a radial position approximately 45° in advance of crank 35.

Intermediate crank 36 occupies a radial position approximately 90° in advance of crank 32 in the direction of crank rotation and 90° behind crank 34.

The crank pins of cranks 32 and 34 are disposed 180° apart and likewise the pins of cranks 33 and 35 are arranged 180° apart.

Pistons 37 and 38 are arranged for reciprocatory movement within the combustion chambers of cylinders 10 and 11 respectively, and these pistons are connected to the crank pins 32 and 33 respectively, by cranks 39 and 40.

Arranged for reciprocation within the combustion chambers in cylinders 12 and 13 are, respectively, pistons 41 and 42, and connecting said pistons with the pins of cranks 34 and 35 respectively, are connecting rods 43 and 44.

Arranged for reciprocation within chambers 15 and 16 are, respectively piston valves 45 and 46 that control ports 19 and 22, and these piston valves are connected by suitable connecting rods such as 47, to eccentrics 48 on crank shaft 30. These eccentrics are arranged so that piston valves 45 and 46 are moved into positions so as to uncover ports 19 and 22 only while ports 17 and 18 are closed by pistons 38 and 42 respectively.

Secured to the underside of head block 23 and extending downwardly therefrom into the upper portion of the chamber within cylinder 14 is a tubular member 49, the lower end of which terminates in a fixed piston head 50. The upper end of this tubular member is connected by means of a duct 51 that is formed in the head 23 with the upper end of duct 20.

Secured to the central portion and top of crank case 29 is the lower end of a tubular member 51, the upper end of which terminates in a fixed piston head 52. This tubular member 51 and the fixed head 52 are duplicates of tubular member 49 and head 50.

The lower end of tubular member 51 is connected by a duct 53 that is formed in the upper portion of the crank case with the open lower end of duct 21.

The open portions of a cylindrical member 54 that functions as a pumping piston that surrounds the heads 50 and 52, and formed at the center of said member 54 is a partition 55. Extending through this partition is a wrist pin 56 to the projecting ends of which are connected the upper ends of a yoke 57, which latter extends downwardly through openings in the top of the crank case and the lower end of said yoke is journalled to the centrally arranged crank 36.

The operation of my improved engine is as follows:

The movements of the piston valves are timed so that piston valve 46 uncovers ports 22, while the double acting pump piston 54 is moving upwardly or inwardly, and piston valve 45 uncovers ports 19 while said double acting pump is moving downwardly or outwardly. As a result, while ports 19 are uncovered by piston valve 45, the suction produced by the double acting pump cylinder 54 in the chamber beneath fixed head 50 will draw into said chamber a fresh gaseous fuel charge through port 24, valve chamber 15, open ports 19, ducts 20 and 51, and through tubular member 49.

As pump piston 54 passes low center and moves upwardly, the gaseous fuel charge drawn into pump chamber beneath head 50 will be compressed within member 49, duct 51 and duct 20 (ports 19 at this time being closed by piston valve 45) and when the head of piston 38 and the head of piston 45 uncovers ports 17, the compressed gaseous fuel charge will rush into combustion chamber 11, common clearance chamber 26 and combustion chamber 10, which action expels the products of combustion from the previously ignited charge through exhaust ports 16ª that lead from chamber 10, and which exhaust ports are uncovered and opened slightly in advance of the opening of inlet ports 17 due to the lead of piston 37 over piston 38.

On the succeeding upward travel of pistons 37 and 38, the gaseous fuel charge pumped into chambers 10 and 11 will be compressed therein and in common clearance chamber 26 until piston 38 passes high center, whereupon the compressed charge is fired by a spark produced between the terminals of the electrodes of corresponding spark plug 28 and the rise in pressure following combustion of the compressed charge will be impressed on the heads of pistons 37 and 38 to drive same downwardly on their power stroke.

Obviously, the operation of pistons 41, 42 and piston valve 46 is the same as that just described.

On the upward stroke of the double acting pump 54, the gaseous fuel will be drawn into the pumping chamber above head 52, through inlet port 25, piston valve chamber 16, ports 22 (the latter being uncovered due to the position of piston valve 46), duct 21, duct 53, and finally through tubular member 51 into the pump chamber between head 52 and partition 55.

On the downward stroke of the pump piston, this gaseous fuel charge will be pumped through tubular member 51, duct 53, duct 21 and inlet ports 18 into combustion chamber 13 above the piston 42 therein.

Thus it will be seen that I have provided a relatively simple and practical two stroke cycle internal combustion engine, wherein the power unit includes two pairs of combustion cylinders, the head ends of the chambers in the members of each pair, being connected by a common clearance and combustion chamber, and the gaseous fuel charges to the two pairs of combustion chambers being pumped thereinto by a double acting pump that is disposed between the pairs of combustion cylinders.

An engine embodying the principles of my invention may comprise two sets of cylinders as herein shown and described, said sets being arranged in two rows, and in angular planes to form a V-structure, in which event, a single crank shaft is used and the connecting rods from the pistons in one set or row of combustion chambers having their crank ends yoked for engagement with the crank pins 32, 33, 34 and 35.

When the V-structure is produced, the lower ends of the two yokes 57 are connected to crank pin 36 as illustrated in Fig. 1.

It will be readily understood that minor changes in the size, form and construction of the various parts of my improved internal combustion engine may be made and substituted for those herein shown and described without departing from the spirit of the invention, the scope of which is set forth in the appended claims.

I claim as my invention:

1. In a two stroke cycle internal combustion engine, a unit of two dual cylinder combustion chambers, a piston within each combustion cylinder, a double acting single reciprocating fresh charge pump member arranged between the two dual cylinder combustion chambers, piston valves arranged for operation between the double acting pump and the immediately adjacent combustion cylinders for controlling the admission of fresh charge volumes to the pump chambers, a crank shaft with separate crank pins to which each of the two pistons of each of the dual cylinder combustion chambers are separately connected and one of the crank pins of each of the two pins of the crank shaft, to which the two pistons of each dual cylinder combustion chamber are separately connected, being arranged in advance rotatively relative to the position of the other crank pin of the two crank pins to which the two pistons of a dual cylinder combustion chamber are connected.

2. In a two stroke cycle internal combustion engine, a series of five cylinders arranged in a row, with their axes parallel and in the same plane, the first and second cylinders from each end of the row functioning as combustion cylinders, and having their head ends joined by a common compression and combustion clearance chamber, thereby providing a pair of dual combustion chambers, a single reciprocating fresh charge pumping member developing a fresh charge pump function on each stroke and arranged between the pair of dual combustion chambers, piston valves arranged for operation between the double acting pump and the immediately adjacent combustion cylinders for controlling the admission of fresh charge volumes to the pump chambers, a crank shaft having five separate throws and separate connections from the pistons within the dual combustion chambers and said pumping member, to the respective throws of said crank shaft.

3. In a two stroke cycle internal combustion engine, a series of five cylinders arranged in a row, with their axes parallel and in the same plane, the first and second cylinders from each end of the row functioning as combustion cylinders, and having their head ends joined by a common compression and combustion clearance chamber, thereby providing a pair of dual combustion chambers, a single reciprocating fresh charge pumping member developing a fresh charge pump function on each stroke and arranged between the pair of dual combustion chambers, piston valves arranged for operation between the double acting pump and the immediately adjacent combustion cylinders for controlling the admission of fresh charge volumes to the pump chambers, a crank shaft having five separate throws, separate connections from the pistons within the dual combustion chambers and said pumping member, to the reciprocative throws of said crank shaft and the members of the pairs of crank pins of the cranks to which the two pistons of each dual combustion chamber are separately connected being arranged in different radial planes.

4. In a two stroke cycle internal combustion engine, a series of five cylinders arranged in a row, with their axes parallel and in the same plane, the first and second cylinders from each end of the row functioning as combustion cylinders, and having their head ends joined by a common compression and combustion clearance chamber, thereby providing a pair of dual combustion chambers, a single reciprocating fresh charge pumping member developing a fresh charge pump function on each stroke and arranged between the pair of dual combustion chambers, piston valves arranged for operation between the double acting pump and the immediately adjacent combustion cylinders for controlling the admission of fresh charge volumes to the pump chambers, a crank shaft having five separate throws, separate connections from the pistons within the dual combustion chambers and said pumping member, to the respective throws of said crank shaft, the members of the pairs of crank pins of the cranks to which the two pistons of each dual combustion chamber are separately connected, being arranged in different radial planes, and the five throws of said crank shaft occupying five different radial positions.

In testimony whereof I affix my signature.

EVERETT R. BURTNETT.